United States Patent [19]

Montsinger

[11] Patent Number: 5,176,775
[45] Date of Patent: Jan. 5, 1993

[54] APPARATUS AND METHOD FOR FORMING FIBER FILLED THERMOPLASTIC COMPOSITE MATERIALS

[76] Inventor: Lawrence V. Montsinger, 1837 Kilmonack La., Charlotte, N.C. 28226

[21] Appl. No.: 809,221

[22] Filed: Dec. 16, 1991

Related U.S. Application Data

[63] Continuation of Ser. No. 424,717, Oct. 20, 1989, abandoned.

[51] Int. Cl.⁵ .............................................. B05D 1/18
[52] U.S. Cl. ...................... 156/181; 156/166; 156/180; 156/250; 156/441; 264/136; 264/174; 118/123; 118/125; 118/405; 118/420; 425/112; 425/114; 427/434.4; 427/434.6
[58] Field of Search ............ 156/166, 180, 181, 441, 156/244.12, 244.23, 244.18, 250, 269; 264/174, 136; 425/114, 112; 118/420, 405, 123, 125; 427/434.4, 434.5, 434.6; 83/913

[56] References Cited

U.S. PATENT DOCUMENTS

| | | | |
|---|---|---|---|
| 1,454,224 | 5/1923 | Schmidt | 427/434.5 |
| 2,730,455 | 1/1956 | Swann | 427/434.6 X |
| 3,150,026 | 9/1964 | Taly | 118/405 X |
| 3,154,908 | 11/1964 | Cilker et al. | |
| 3,873,389 | 3/1975 | Daniels | 156/181 |
| 3,993,726 | 11/1976 | Moyer | 264/174 |
| 4,439,387 | 3/1984 | Hawley | 425/114 X |
| 4,565,153 | 1/1986 | Corley | 118/420 X |
| 4,614,678 | 9/1986 | Ganga | 264/174 X |
| 4,720,366 | 1/1988 | Binnersley et al. | 264/174 X |
| 4,728,387 | 3/1988 | Hilakos | 118/420 X |
| 4,806,298 | 2/1989 | Wilkinson et al. | 118/420 X |
| 4,894,105 | 1/1990 | Dyksterhouse et al. | 156/180 X |
| 4,957,422 | 9/1990 | Glemet et al. | 425/114 |
| 5,002,712 | 3/1991 | Goldmann et al. | 427/434.6 X |

FOREIGN PATENT DOCUMENTS

| | | | |
|---|---|---|---|
| 0102711 | 3/1984 | European Pat. Off. | 156/273.9 |
| 3521228 | 12/1986 | Fed. Rep. of Germany | 156/180 |
| 371518 | 5/1939 | Italy | 427/434.4 |
| 53-1266 | 1/1978 | Japan | 264/136 |
| 895701 | 1/1982 | U.S.S.R. | 264/136 |

*Primary Examiner*—Jeff H. Aftergut
*Attorney, Agent, or Firm*—Bell, Seltzer, Park & Gibson

[57] ABSTRACT

This invention relates to composite materials formed by thermoplastic materials reinforced by fibers, and to methods and apparatus for forming such materials, where the thermoplastic and fiber components are such as to impart to the composite materials enhanced strength as compared with materials made previously to this invention. An important distinguishing characteristic of the disclosure is that advancing heated fiber is directed to move in one direction and while a flow of heated thermoplastic material is directed to move in a direction opposite to and in intimate impregnating enclosure of the advancing heated fiber, so that shear forces arising between the advancing heated fiber and the directed flow of thermoplastic material promote wetting and impregnation of the fiber by the thermoplastic material.

34 Claims, 3 Drawing Sheets

APPARATUS AND METHOD FOR FORMING FIBER FILLED THERMOPLASTIC COMPOSITE MATERIALS

This is a continuation of co-pending application Ser. No. 07/424,717, filed on Oct. 20, 1989, now abandoned.

FIELD AND BACKGROUND OF INVENTION

This invention relates to composite materials formed by thermoplastic materials reinforced by fibers. More particularly, this invention relates to such composite materials, and to methods and apparatus for forming such materials, where the thermoplastic and fiber components are such as to impart to the composite materials enhanced strength as compared with materials made previously to this invention.

The forming of composite materials using polymers and fibers has been known heretofore, and apparatus, processes and products relating to such composite materials are disclosed in, for example, Singer U. S. Pat. No. 4,341,822; Hawley U.S. Pat. No. 4,439,387; Cogswell U.S. Pat. No. 4,549,920; and Cogswell U.S. Pat. No. 4,559,262, to which the interested reader is referred for reviews of still earlier prior disclosures. At least certain of the mentioned disclosures describe composite materials formed using thermoplastic polymers and structural reinforcement fibers such as glass, aramids, metallic fibers or the like, and address the difficulties of obtaining penetration of polymers into the fibers and embedment of the fibers within a body of the polymeric material. The relative penetration or embedment, or ease of accomplishing such penetration or embedment, has been referred to heretofore (and will be here referred to) as the "wetting" of the fiber with the polymeric material.

Composite materials of the broad class identified above have been formed using both thermosetting and thermoplastic polymeric materials. The difficulties of producing composite materials with the two classes of polymeric materials differ substantially, due to the characteristics of the polymeric materials. The present invention is concerned only with thermoplastic materials, as to which wetting has been a previously insurmountable problem with high melt viscosity thermoplastic materials. This has been a limiting factor of the strength attainable by such materials, as stronger thermoplastics typically also have higher viscosities.

BRIEF STATEMENT OF INVENTION

With the foregoing in mind, it is an object of this invention to provide apparatus for forming fiber filled thermoplastic composite materials which is capable of achieving wetting of fibers with thermoplastic materials of higher melt viscosities than have been usable heretofore. In realizing this object of the present invention, enhanced strength composite materials are formed and become available for use and fabrication.

A further object of this invention is to form fiber filled thermoplastic composite materials in accordance with methods by which the relative movement of extruded molten thermoplastic material and fiber to be impregnated are used to advantage in achieving wetting of fiber with higher melt viscosity thermoplastic materials. In realizing this object of the invention, the relative directions and speeds of movement of the materials being brought together to form the composite are used to advantage in avoiding potentially adverse effects of the use of elevated temperatures or the like to achieve acceptable wetting.

Yet a further object of this invention is to produce fiber filled thermoplastic composite materials having enhanced strength and physical properties over those materials known heretofore. In realizing this object of the invention, there are made available to plastics fabricators or molders materials which are improved over those previously available, thereby leading to improvement in the products of those fabricators or molders.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
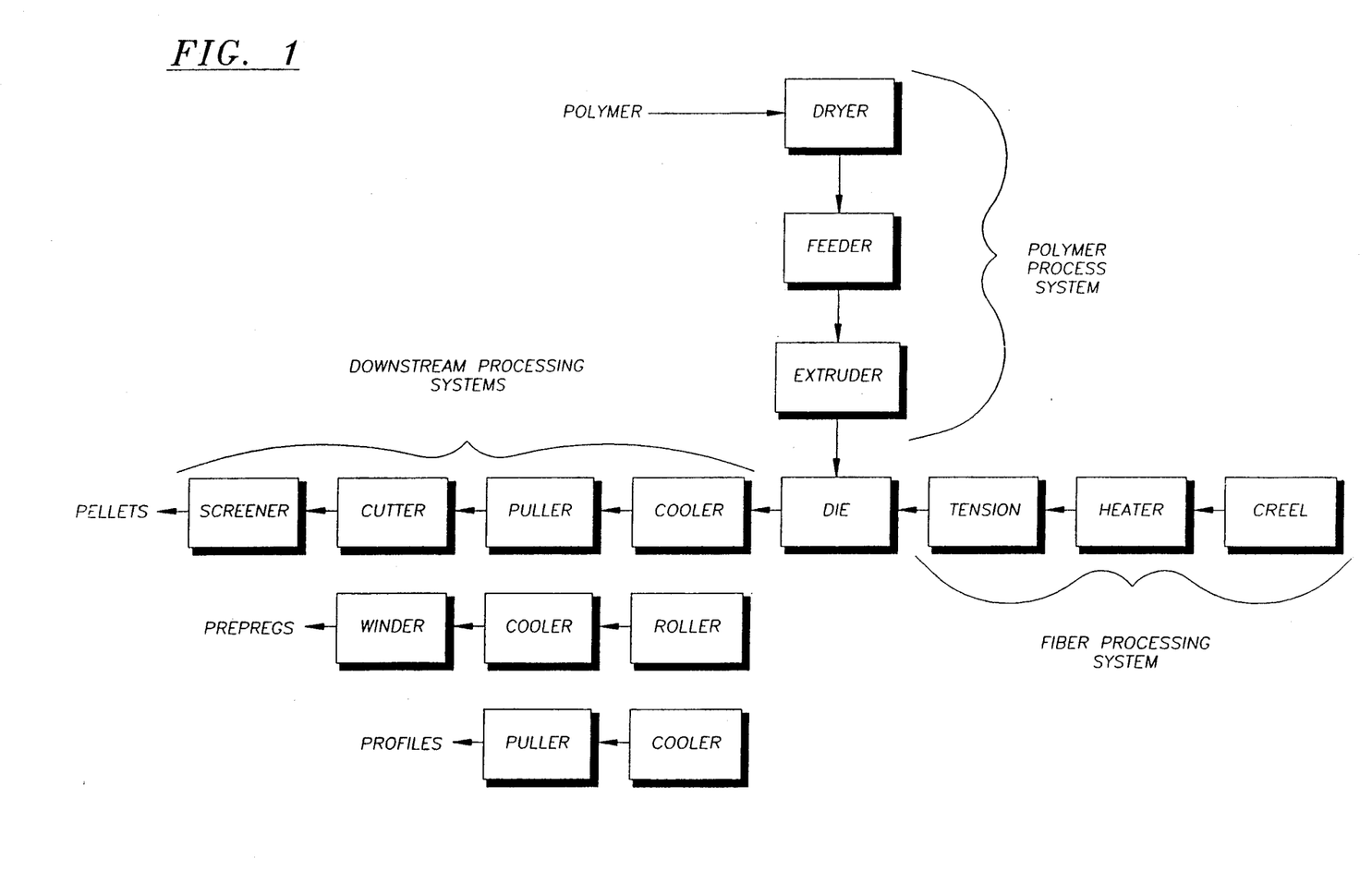
FIG. 1 is a schematic flow diagram illustrating the movement of materials through an apparatus and the processes of this invention.

Referring now more particularly to the accompanying drawings, an apparatus capable of producing the fiber filled thermoplastic composite materials of this invention is generally indicated at 10 in FIG. 2, and the movement of materials through that apparatus will be described with reference to FIG. 1 as well as FIG. 2. Broadly taken, the apparatus has fiber supply means, preferably in the form of a creel mounting a plurality of packages of fiber material, for supplying continuous filament fiber; advancing means for advancing fiber (indicated at F in the Figures) from the creel along a predetermined path of travel; heating means disposed along the predetermined path of fiber travel for heating advancing fiber to a predetermined elevated temperature; plastic supply means, preferably in the form of an extruder, for supplying molten, heated thermoplastic material; and means disposed along the predetermined path of fiber travel and operatively communicating with the extruder for directing advancing heated fiber in one direction and for receiving a flow of heated thermoplastic material and directing the flow of heated thermoplastic material in a direction opposite to and in intimate impregnating enclosure of the advancing heated fiber moving in the one direction. In accordance with important distinguishing characteristics of this invention, shear forces arising between the advancing heated fiber and the directed flow of thermoplastic material promote wetting of the fiber by and impregnation of the fiber by the thermoplastic material.

In more detail, the supply means or creel is designed for receiving and retaining a plurality of packages of continuous fiber strand material. The strand material may be a man made or artificial continuous filament such as an organic fiber, glass fiber, aramid fiber, carbon fiber, or metallic fiber. Typically, such fibers are supplied by fiber producers in the form of a roving, tow or band, and may be more or less twisted depending upon the specific material and manner of handling prior to introduction into the processes of this invention. Desirably, the creel will deliver the fiber into the process of this invention with minimal twist, in order to provide the least possible interference with impregnation or enclosure of the fiber. The creel is indicated generally at 11, and may be designed in a number of different ways to accomplish the intended result described. The selection of a specific creel design is left to the person of skill in the arts of handling fiber tow or bands.

Fiber is drawn from the creel along a path of travel defined by appropriate guide rolls, bars and the like to one or more sets of drawn rolls or an endless, product gripping conveyor. As will be appreciated, fiber materials may be pulled through apparatus such as that described, and generally may not be pushed. Further, means for controlling the tension in the fiber may be appropriate or required at various points along the path in order to assure orderly passage of the fiber, and will be provided as deemed necessary by persons skilled in the arts of transporting fiber materials. Thus there may be a pretensioning system immediately in advance of the strand heater described hereinafter, and a post tension system immediately after the heater. The tensioning systems perform yet another function in that they together form the fiber into a planar web, enabling passage of the web through a heater (now to be described) while the individual filaments are maintained at a uniform distance from the heat source(s) used, thereby assuring more uniform heating.

Fiber F leaving the creel passes to a heating means indicated generally at 16, where the fiber is heated to an elevated temperature closer to the temperature of the molten, flowing thermoplastic with which the fiber will be encircled. In the form illustrated, the heating means 16 takes the form of a heating chamber enclosing advancing fiber and means for circulating hot gas through the chamber. Alternatively, the heating means may take the form of a chamber or tunnel within which the fiber F is exposed to infrared radiation.

As fiber advances along its path, thermoplastic material is prepared by being preheated or dried, as appropriate or necessary, in a drier 18 and then melted in a feeder and passed into an extruder 19. The drier, feeder and extruder may be of substantially conventional design for handling thermoplastic materials of the class selected (as described more fully hereinafter), and function for melting thermoplastic material and delivering molten thermoplastic material under pressure and at predetermined flow rates.

Fiber F and thermoplastic material brought to an appropriate state for joining with the fiber by the extruder 19 then pass to a vertical column impregnation means 20 oriented for passage of continuous fibers and molten thermoplastic material vertically thereof, and which forms an important element in the apparatus of this invention. Within the impregnation column 20 occurs a process step which is of particular importance to this invention and which is illustrated in FIG. 3, the enlarged scale, sectional vertical view showing the relationship of the advancing fiber and thermoplastic. More specifically, the impregnation column is arranged for downward passage of fiber therethrough and for upward movement of thermoplastic material therewithin and is heated by appropriate means such as cartridge electrical resistance heaters embedded in the structure of the column. The counter movement gives rise to the shear forces between the advancing heated fiber and the directed flow of thermoplastic material which, in accordance with this invention, promote wetting of the fiber by and intimate impregnating enclosure of the fiber in the thermoplastic material. Additionally, the path along which the fiber F is guided within the impregnation column is such as to cause the thermoplastic material entrained in downward movement to be squeezed between the fibers.

That is, and as shown in FIG. 3, fibers entering the upper end of the impregnation column 20 are guided along two spaced paths, and form two spaced sheets or arrays. At the foot of the column 20, the two sheets or arrays are passed about a single turning guide or bar 21, thereby requiring that the sheets come to a single plane. The gradual converging of the fibers moving downwardly first draws thermoplastic material into the space between the sheets, and then squeezes the thermoplastic material into intimate contact with the fibers, assisting in assuring wetting of the fibers with the thermoplastic.

The squeezing force is in part a function of, and determined by, the contact of the fibers with the turning guide. As will be understood, the web or band of fibers passing downwardly through the impregnation column 20 is turned through ninety degrees from vertical to horizontal about the turning guide. At the same time, the web is being narrowed to pass through the outlet of the impregnation column, so that the diameter of the outlet from the column controls the area of wrap about the guide. With the tension imposed on the advancing fiber being held constant, a reduction in the diameter of the guide reduces the area of contact with the fiber, thereby increasing the pressure imposed on the fiber at the location of contact and increasing the force acting to impregnate the fiber.

Figure 2:
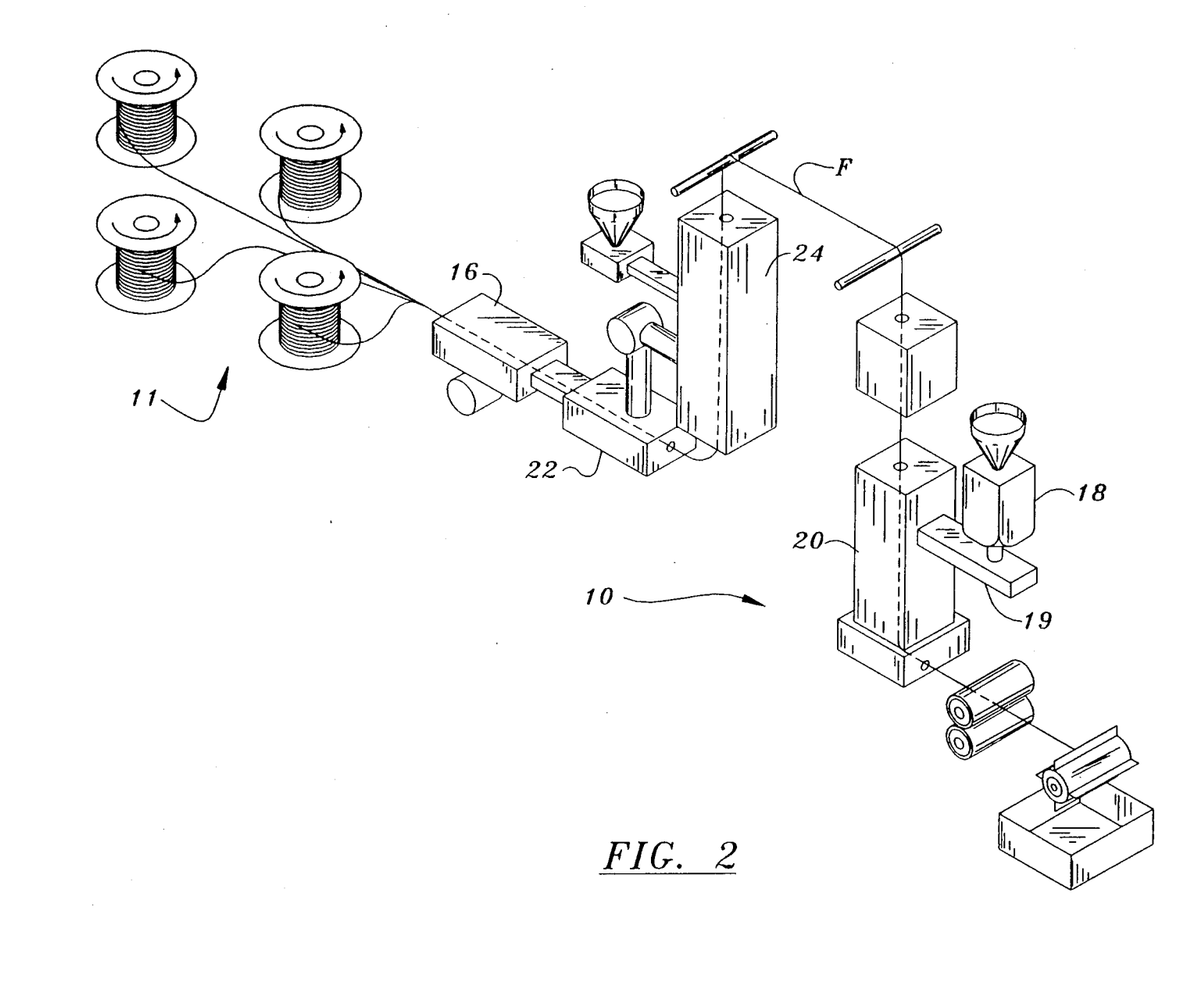
FIG. 2 is a schematic elevation view of apparatus embodying the flow diagram of FIG. 1.
Figure 3:
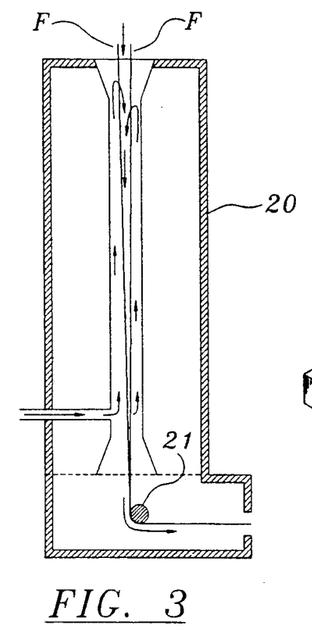
FIG. 3 is an enlarged scale, partly schematic, vertical section view through a portion of the apparatus of FIG. 2.
Figure 4:
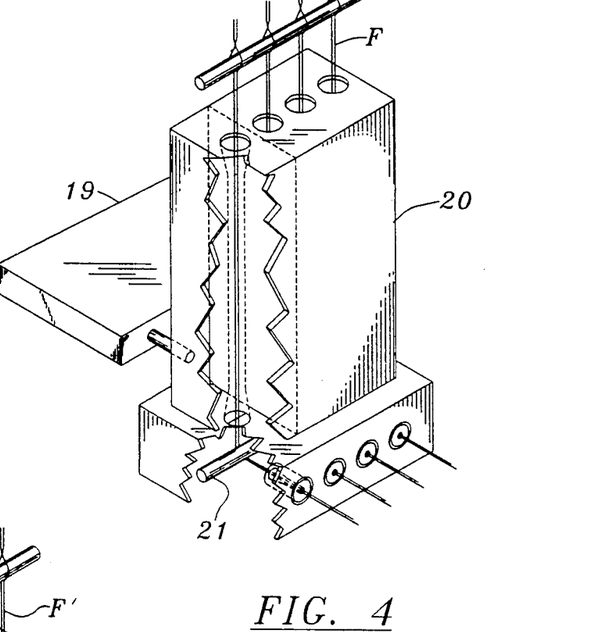
FIG. 4 is an enlarged scale, partly broken away view of portions of the apparatus of FIGS. 2 and 3.

This invention contemplates certain optional variations in the apparatus as described to this point, and the illustration in FIG. 2 in fact shows such variations. In one variation, the bundled fibers delivered from the creel are subjected to forces tending to open the bundles before the fibers pass to the impregnation column. To that end, opening means 22 is disposed along the predetermined path of fiber travel in advance of the impregnation column 20 for subjecting the advancing fiber to electrostatic forces effective for opening bundled multifilament fiber. Persons familiar with the technology of opening bundled multifilaments will be able to adapt other known forces, such as those of flowing fluids such as air, to the opening of fiber passing to the impregnation column.

Fiber moving to the impregnation column may also be treated with a variety of pretreatments. One such pretreatment possibility is indicated in FIG. 2, where a powder deposition means 24 is positioned to receive fiber passing from the opening means 22. The powder deposition means 24 functions for depositing into an opened bundle of multifilament fiber a powdered material effective for precoating the fiber prior to impregnation thereof by thermoplastic material. Another pretreatment possibility is the application of a sizing or lubricant to the fiber, such as by dipping warmed fiber into a liquid holding tank and then passing the dipped fiber through nip or press rolls for stripping excess liquid from the fiber and through a further heating or drying means to prepare the fiber for impregnation. One of the ways in which such pretreatment may prepare bundled fiber for impregnation is by serving to hold the bundled fibers open, thereby facilitating entry of polymer between the individual fibers.

Figures 5, 6:
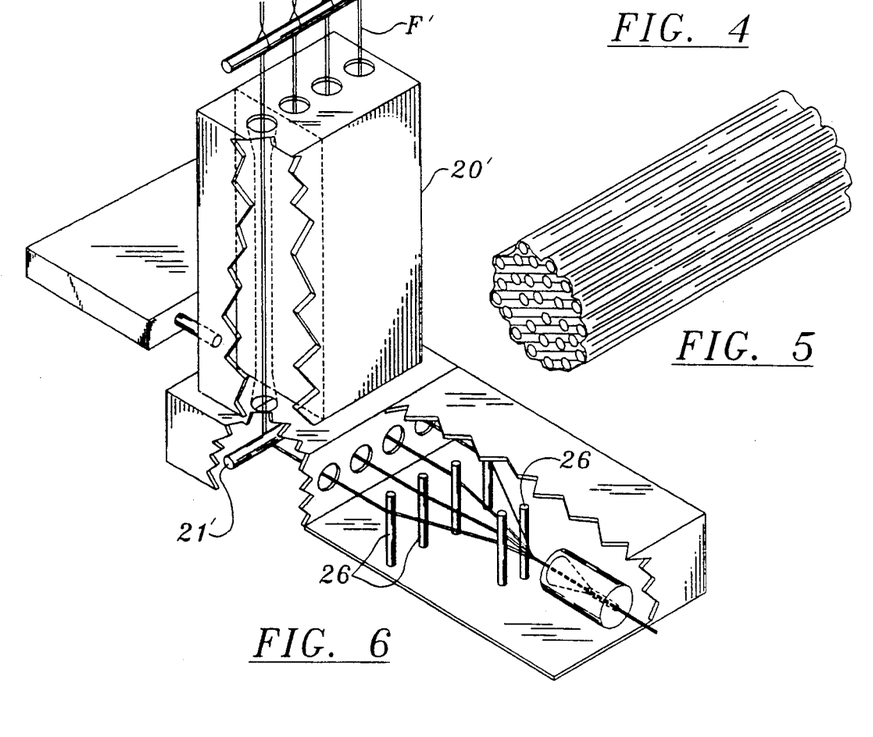
FIG. 5 is a partly sectional, partly perspective view of a product produced in accordance with this invention and using the apparatus of FIGS. 2 through 4.
FIG. 6 is a view similar to FIG. 4 of a modified form of apparatus in accordance with this invention.

Fiber leaving the impregnation column 20 as described with reference to FIG. 1 may also be subjected to yet another step, by passage through a modified apparatus contemplated by this invention, with desirable results. More specifically, the effects of turning a web of fiber through ninety degrees about a turning guide have been described hereinabove. This invention contemplates a modified form in which a plurality of such impregnated multifilament bundles may be joined and bonded together while enhancing the impregnation of all filaments in the bundle, by use of apparatus a illustrated in FIG. 6. As there shown (with components functionally similar to those described before being identified with the addition of prime notation to the reference characters used hereinabove), a plurality of strands of fiber F' are passed downwardly through an impregnation column 20' and about a turning guide 21'. The fiber F' is then passed to a further impregnation section in which each bundle is joined with at least one other bundle and the joined bundles then turned about an axis perpendicular to the axis of the prior turning guide. The perpendicular turning axes are provided by a plurality of turning pins 26. This joining and then turning first increases the number of filaments in the total bundle passing to an exit die and then subjects the joined bundle to pressure which assures uniform impregnation of all individual fibers in the bundle. This process enables the production of products with higher fiber content and in which the impregnating thermoplastic has a higher viscosity, thereby enhancing the physical properties of the final products, be they injection molded parts or preforms of the sorts known as prepregs or structural forms.

As will be appreciated from the foregoing disclosure of the apparatus used, the present invention contemplates methods of producing a fiber reinforced thermoplastic material which has the steps of supplying continuous filament fiber and advancing the fiber along a predetermined path of travel, heating the advancing fiber to a predetermined elevated temperature, supplying heated thermoplastic material, and directing advancing heated fiber in one direction while directing a flow i of heated thermoplastic material in a direction opposite to and in intimate impregnating enclosure of the advancing heated fiber moving in the one direction. As pointed out heretofore, by so directing the fiber and thermoplastic material, shear forces arising between the advancing heated fiber and the directed flow of thermoplastic material promote wetting and impregnation of the fiber by the thermoplastic material. The fiber material supplied may be a multifilament. In the instance where glass is the fiber supplied, a typical roving, tow or band is one which contains about 2,000 filaments and yields 432 yards per pound. With such fiber, the density is about 2.54 grams/cubic centimeter, and filament diameter is in a range of from about 12 to about 16 microns. Aramid rovings suitable for use will may yield about 2000 yards per pound. Suitable carbon fiber may yield about 575 yards per pound with a density of about 1.75 grams/cubic centimeter and 12,000 filaments. Suitable stainless steel fiber may have 10,000 filaments with an 8 micron diameter and a density of 8.02 grams/cubic centimeter, yielding 380 yards per pound. In the process, the filaments of the fiber used are oriented to be parallel, and the fiber is spread into a flat web. The process is such that it includes individually embedding each of a plurality of multifilaments in the selected thermoplastic material. As used in this description, the term "continuous filament" means any fibrous material having filaments in lengths greater than twenty feet or six meters.

In accordance with important characteristics of this invention, the counterflow and squeeze technology of the impregnation column 20 (and the rotational reposition and resqueeze of FIG. 6, where used) enable the use of thermoplastic materials having higher melt viscosities than have been successfully used when practicing the technology known before this invention. Thus the present invention opens the possibility of impregnating fibers of the types described with polybutylene terephthalate, polyester terephthalate, polyurethane, polyamide, polypropylene, polyoxymethylene (polyacetal), polycarbonate, liquid crystal polymer (aromatic co-polymer), polyphenylene sulfide, high density polyethylene, polyvinylchloride, polyetherimide, polyethersulfone and polyetheretherketone.

As will be understood by persons of appropriate skill in the technologies associated with forming thermoplastic materials, the melt viscosity of a polymer is a function of the shear rate to which the material is subjected, shear stress, temperature, molecular weight and concentration of any additives. Generally speaking a lower viscosity will impregnate or wet a fiber bundle better than a higher viscosity polymer. Wetting may also be influenced by surface tension, with polar molecules (having a higher surface energy which equates with a higher surface tension) wetting better than non-polar molecules. Additives may include internal lubricants to reduce melt viscosity and external lubricants to influence the surface polarity of the fiber.

Viscosity in units of poise, as used herein, refers to a function of temperature at extrusion and shear rate to which the thermoplastic material is subjected while at the temperature stated. Temperature at extrusion is here called "stock temperature". Viscosities, for purposes of this description, are defined at a stock temperature and a shear rate of one hundred inverse seconds. That is, as shear rates are a function of a volume rate of flow divided by a volume, the resulting unit is second(s)$^{-1}$, or inverse seconds. In tabular form, the values for certain of the thermoplastic materials contemplated for use in this invention (as of the writing of this description) are as follows:

| Material | Stock Temp. | Viscosity |
|---|---|---|
| Polybutylene terephthalate (PBT) | 540 | 250 |
| Polyester terephthalate (PET) | 580 | 460 |
| Polyurethane (PU) | 500 | 460 |
| Polyamide (PA) | 580 | 520 |
| Polypropylene (PP) | 540 | 1,000 |
| Polyoxymethylene (POM) | 475 | 1,380 |
| Polycarbonate (PC) | 600 | 2,000 |

-continued

| Material | Stock Temp | Viscosity |
|---|---|---|
| Liquid crystal polymer (LCP) | 590 | 3,000 |
| Polyphenylene sulfide (PPS) | 630 | 4,000 |
| High density polyethylene (HDPE) | 550 | 5,400 |
| Polyvinylchloride (PVC) | 400 | 20,000 |

As will be clear at this point in the disclosure of this invention, the fiber and thermoplastic material are brought into intimate engagement with the impregnation column 20. Certain characteristics of that portion of the apparatus, and the process steps which occur therewithin, have been discussed. Attention will now be turned to other information valuable in appreciating the products produced in accordance with this invention. As will be appreciated, the geometry of the impregnation column is such as to maintain sufficient pressure on the materials passing therethrough to accomplish the result desired. Thus the opening in the final die through which the composite product passes from the impregnation column is such as to control the polymer to fiber ratio in the final product and the shape of the cross section of the product. The ratio of polymer to fiber may be in the range of from about 0.25 to about 4.0 to 1.0. The shape may be whatever is desired, within reasonable limits, and will usually be a round cross section (FIG. 5) where pellets are being formed for subsequent extrusion, a rectangular cross section where pre-impregnated ribbons or tapes (herein called "prepregs") are being formed for later build-up fabrication, and any desired cross section (such as that of an I beam) where structural members are being formed directly. In use of an apparatus constructed and operated in accordance with this invention, a slight swelling of the product issuing from the die is noticed when optimal products are being produced, thus indicating that the flow of thermoplastic material from the die is partly due to pressure (extrusion) and partly due to entrainment with the moving fiber (pultrusion). Due to the short residence time in the column, the operating temperature of the column may be up to fifty degrees Fahrenheit higher than the normal processing temperature of the thermoplastic material used. In such event, volatile components of the thermoplastic material may be driven off in the column, and rise to pre-impregnate the downwardly moving fibers.

The products produced in accordance with this invention may be of at least three general types—here referred to as pellets, prepregs, and profiles. The products share the characteristics of having a group of elongate filamentary fibers each extending longitudinally generally parallel to and free of entanglement with other fibers in the group, and a body of thermoplastic material impregnating and enclosing the group of fibers and maintaining individual fibers in the group separate from and extending longitudinally generally parallel to and free of entanglement with other fibers in the group. The specific product produced depends in part on the selection of the forming die, as being circular in cross section, rectangular, or specially formed.

Where the product to be produced is to be a pellet for subsequent use in extrusion of products to be formed of composite materials, then the preferred cross section is circular. Material exiting the column 20 is delivered to a cooling area where it may be impinged upon by flowing cooling air, then passed through a pulling station and advanced to a cutter which chops or cuts the advancing, essentially infinitely long, product into desired short lengths. Typically, a pellet will be a body of material having a generally circular cross sectional configuration and a length greater than twice the diameter of the cross sectional diameter of the body, with reinforcing fibers extending through the body. The reinforcing fibers in such a pellet have essentially the same length as the pellet and may, in accordance with this invention, be substantially more closely packed than has been the case heretofore. More specifically, where the fiber is glass, the number of individual fibers may be in the range of from about 2,000 to about 32,000, and the percentage of fiber by weight of the pellet may be as high as eighty percent.

Prepregs are typically delivered to a compressed air or liquid cooled drum or roller, and packaged by winding. Prepregs may have widths in a range of from a fraction of an inch to several inches, and thicknesses in a range of from about 0.010 to about 0.030 inch.

Profiles are handled similarly to pellets, with the exception that the length and cross section design are usually determined from the intended application. Examples of cross sectional designs may be various rod, channel or I beam forms as known generally from the manufacture of other materials such as steel.

In the drawings and specifications there has been set forth a preferred embodiment of the invention and, although specific terms are used, the description thus given uses terminology in a generic and descriptive sense only and not for purposes of limitation.

What is claimed is:

1. A method for producing a fiber reinforced thermoplastic material comprising
    providing an impregnation chamber having a plurality of elongate impregnation passageways, each with an entrance end and an exit end,
    directing a plurality of strands of continuous filament fiber along a predetermined advancing path of travel into and through the respective passageways, each entering through the entrance end and exiting through the exit end,
    directing molten thermoplastic polymer material from an extruder into the respective impregnation passageways at a location adjacent the exit end thereof and in a direction toward the entrance end in opposing, countercurrent direction to the advancing strands of fiber and in intimate contact with the respective advancing strands of fiber for wetting and impregnating the strands of fiber with the thermoplastic material,
    engaging and turning the strands of fiber through a predetermined angle to squeeze the fiber and thermoplastic material together,
    joining the strands of impregnation fiber bundle into one bundle, and
    pulling the joined impregnated fiber bundle from the exit end of the impregnation chamber while maintaining tension on the advancing strands of fiber in the impregnation passageway as they contact the molten thermoplastic polymer.

2. The method according to claim 1 including the step of turning the fiber strands through a second predetermined angle perpendicular to the first predetermined angle.

3. The method according to claim 1 wherein the exit end of the impregnation passageway is provided with an exit die having a restricted die opening of predetermined size and including the step of metering the molten polymer onto the polymer impregnated fiber by passing the polymer impregnated fiber through the predetermined size die opening.

4. The method according to claim 3 wherein the predetermined size of the die opening is selected to provide a ratio of thermoplastic polymer to fiber in the range of about 0.25 to 1.0 to about 4.0 to 1.0.

5. A method for producing a fiber reinforced thermoplastic material comprising
providing an impregnation chamber having an elongate impregnation passageway with an entrance end and an exit end,
directing a continuous filament fiber along a predetermined advancing path of travel into and through the passageway, entering through the entrance end and exiting through the exit end,
directing molten thermoplastic polymer material into the impregnation passageway at a location adjacent the exit end thereof and in a direction toward the entrance end in opposing, counter-current relation to the advancing fiber and in intimate contact with the advancing fiber for wetting and impregnating the fiber with the thermoplastic material, and
pulling the polymer impregnated fiber from the exit end of the impregnation passageway while maintaining tension on the advancing fiber in the impregnation passageway as it contacts the molten thermoplastic polymer.

6. The method according to claim 5 including the step of engaging and turning the advancing fiber through a predetermined angle while in the impregnation chamber to squeeze the fiber and thermoplastic material together and to assure wetting of the fiber with the thermoplastic material.

7. The method according to claim 5 including the step of heating the advancing fiber before advancement into the impregnation chamber.

8. The method according to claim 5 wherein the fiber comprises a multifilament fiber bundle and including the step of opening the multifilament fiber bundle before advancement into the impregnation chamber.

9. The method according to claim 5 including the step of depositing powdered material onto the fiber for precoating the fiber before advancement of the fiber into the impregnation chamber.

10. The method according to claim 5 including the step of depositing liquid onto the fiber for precoating the fiber before advancement into the impregnation chamber.

11. The method according to claim 5 including the step of cooling the fiber as its exits the impregnation chamber.

12. The method according to claim 5 including the step of cutting the polymer impregnated fiber into discrete lengths.

13. The method according to claim 5 including the step of advancing the fiber downward through the passageway while directing the flow of thermoplastic material in an upward counter-current relation to the advancing fiber.

14. The method according to claim 5 wherein the exit end of the impregnation passageway is provided with an exit die having a restricted die opening of predetermined size and including the step of metering the molten polymer onto the polymer impregnated fiber by passing the polymer impregnated fiber through the predetermined size die opening.

15. The method according to claim 14 wherein the predetermined size of the die opening is selected to provide a ratio of thermoplastic polymer to fiber in the range of about 0.25 to 1.0 to about 4.0 to 1.0.

16. Apparatus for producing a fiber reinforced thermoplastic material comprising
an impregnation chamber having a vertically oriented, elongate impregnation passageway with an upper entrance end and a lower exit and,
an exit die with a restricted die opening mounted at the lower exit end of the impregnation passageway.
a supply of continuous filament fiber,
means for directing the fiber along a predetermined advancing path of travel into and through said impregnation passageway, entering through said entrance end and exiting through the restricted die opening of said exit die,
an extruder for providing a supply of molten, thermoplastic polymer under pressure,
means for directing molten thermoplastic material from said extruder into said impregnation passageway at a location adjacent said exit end thereof so that the molten polymer flows upward in counter-current relation to the direction of the advancing fiber and in intimate contact with the advancing fiber whereby shear forces arising between the advancing fiber and the flow of thermoplastic material promote wetting and impregnating of the fiber with the molten thermoplastic polymer,
a turning guide positioned within said passageway adjacent said exit end for engaging and turning the advancing fiber through a predetermined angle prior to passing through said exit die for squeezing the fiber and thermoplastic material together and assuring wetting of the fiber with the thermoplastic material, and
means on the downstream side of said impregnation chamber for pulling the polymer impregnated fiber from the impregnation chamber and through said exit die and for maintaining tension on the advancing fiber in the impregnation passageway as it contacts the molten thermoplastic polymer.

17. An apparatus according to claim 16 wherein the size of said restricted die opening in relation to the size of the advancing fiber is such that the ratio of thermoplastic polymer to fiber is in the range of from about 0.25 to 1.0 to about 4.0 to 1.0.

18. An apparatus according to claim 16 including a heating chamber positioned along the predetermined path of travel of the fiber to the entrance end of said impregnation passageway for preheating the advancing fiber before it enters the impregnation passageway.

19. An apparatus according to claim 16 including means located downstream of said means for pulling the impregnated fiber for cutting the polymer impregnated fiber into discrete lengths.

20. Apparatus for producing a fiber reinforced thermoplastic material comprising
an impregnation chamber having a plurality of elongate impregnation passageways, each with an entrance end and an exit end,
a supply of a plurality of strands of continuous filament fiber,
means for directing the strands of fiber along a predetermined advancing path of travel into and through respective ones of said impregnation passageways, each entering through said entrance end and exiting through the exit end, an extruder for providing a supply of molten, thermoplastic polymer under pressure, means for directing molten thermoplastic material from said extruder into each of said impregnation passageways at a location adjacent said exit end thereof so that the molten polymer flows along the respective passageways toward said entrance end thereof in countercurrent relation to the direction of movement of the advancing strands of fiber and in intimate contact with the respective advancing strands of fiber whereby shear forces arising between the advancing fiber and the flow of thermoplastic material promote wetting and impregnating of the strands of fiber with the molten thermoplastic polymer, at least one guide positioned for engaging and joining the polymer impregnated strands together into one bundle, and exit die with a restricted die opening through which the bundle of fibers passes, and means on the downstream side of said exit die for pulling the polymer impregnated fiber bundle from the impregnation chamber and through said exit die and for maintaining tension on the advancing strands of fiber in the impregnation passageway as they contact the molten thermoplastic polymer.

21. An apparatus according to claim 20 additionally including respective individual turning guides located upstream of said one guide and oriented for turning each individual fiber strand through a predetermined angle prior to reaching said one guide for squeezing the fiber and thermoplastic material together and assuring wetting of the fiber with the thermoplastic material.

22. An apparatus according to claim 20 wherein said elongate impregnation passageway housing is oriented in a vertical direction and said fiber is advanced in a downward direction through said passageway.

23. An apparatus according to claim 20 wherein the size of said restricted die opening in relation to the size of the advancing fiber is such that the ratio of thermoplastic polymer to fiber is in the range of about 0.25 to 1.0 to about 4.0 to 1.0.

24. An apparatus according to claim 20 including means located downstream of said means for pulling the impregnated fiber for cutting the polymer impregnated fiber into discrete lengths.

25. Apparatus for producing a fiber reinforced thermoplastic material comprising an impregnation chamber having an elongate impregnation passageway with an entrance end and an exit end, an exit die with a restricted die opening mounted at the exit end of said impregnation passageway, a supply of continuous filament fiber, means for directing the fiber along a predetermined advancing path of travel into and through said impregnation passageway, entering through said entrance end and exiting through the restricted die opening of said exit die, an extruder for providing a supply of molten, thermoplastic polymer under pressure, means for directing molten thermoplastic polymer material from said extruder into said impregnation passageway at a location adjacent said exit end thereof so that the molten polymer flows along the passageway toward said entrance end thereof in counter-current relation to the direction of movement of the advancing fiber and in intimate contact with advancing fiber and the flow of thermoplastic material promote wetting and impregnating of the fiber with the molten thermoplastic polymer, and means on the downstream side of said impregnation chamber for pulling the polymer impregnated fiber from the impregnation chamber and through said exit die and for maintaining tension on the advancing fiber in the impregnation passageway as it contacts the molten thermoplastic polymer.

26. An apparatus according to claim 25 wherein said elongate impregnation passageway is oriented in a vertical direction and said fiber is advanced in a downward direction through said passageway.

27. An apparatus according to claim 25 including a turning guide positioned within said passageway adjacent said exit end for engaging and turning the advancing fiber through a predetermined angle prior to passing through said exit die for squeezing the fiber and thermoplastic material together and assuring wetting of the fiber with the thermoplastic material.

28. An apparatus according to claim 25 wherein the size of said restricted die opening in relation to the size of the advancing fiber is such that the ratio of thermoplastic polymer to fiber is in the range of from about 0.25 to 1.0 to about 4.0 to 1.0.

29. An apparatus according to claim 25 including a heating chamber positioned along the predetermined path of travel of the fiber to the entrance end of said impregnation passageway for preheating the advancing fiber before it enters the impregnation passageway.

30. An apparatus according to claim 25 wherein the continuous filament fiber comprises a bundle of multifilament fibers and including means positioned along the predetermined path of travel for opening the bundle of multifilament fibers before advancement of the fiber into said impregnation chamber.

31. An apparatus according to claim 25 including means positioned along the predetermined path of travel of the fiber to the impregnation chamber for depositing powdered material onto the fiber before advancement of the fiber into said impregnation chamber.

32. An apparatus according to claim 25 including means positioning along the predetermined path of travel of the fiber to the impregnation chamber for depositing a liquid onto the fiber before advancement of the fiber into said impregnation chamber.

33. An apparatus according to claim 25 including means positioned outside the exit end of the impregnation chamber for cooling the fiber as its exits the impregnation chamber.

34. An apparatus according to claim 25 including means located downstream of said means for pulling the impregnated fiber for cutting the polymer impregnated fiber into discrete lengths.

* * * * *

UNITED STATES PATENT AND TRADEMARK OFFICE
CERTIFICATE OF CORRECTION

PATENT NO. : 5,176,775
DATED : January 5, 1993
INVENTOR(S) : Lawrence V. Montsinger It is certified that error appears in the above-identified patent and that said Letters Patent is hereby corrected as shown below:

Column 5, line 56, delete "i".

Column 8, line 55, "impregnation" should be -- impregnated --.

Column 10, line 9, "and" (second occurrence) should be -- end --.

Column 12, line 8, after "fiber" insert -- whereby shear forces arising between the advancing fiber --.

Column 12, line 51, "positioning" should be -- positioned --.

Signed and Sealed this

Second Day of November, 1993

Attest:

BRUCE LEHMAN

Attesting Officer        Commissioner of Patents and Trademarks